United States Patent [19]
Mecklenborg

[11] 3,871,750
[45] Mar. 18, 1975

[54] FOCUSING ROLL AND DISPLACEMENT PRISMS

[75] Inventor: Richard A. Mecklenborg, Binghamton, N.Y.

[73] Assignee: The Singer Company, Binghamton, N.Y.

[22] Filed: Nov. 19, 1973

[21] Appl. No.: 417,308

Related U.S. Application Data

[63] Continuation-in-part of Ser. No. 207,033, Dec. 13, 1971, abandoned.

[52] U.S. Cl. ............. 350/286, 350/26, 350/285, 350/299
[51] Int. Cl. ............................................. G02b 5/04
[58] Field of Search .................. 350/6, 7, 22–24, 350/26, 285, 286, 287, 288, 299

[56] References Cited
UNITED STATES PATENTS

| | | | |
|---|---|---|---|
| 2,147,156 | 2/1939 | Geffcken | 350/287 |
| 3,477,788 | 11/1969 | Newcomer | 350/287 |
| 3,625,598 | 12/1971 | Brown | 350/299 |

*Primary Examiner*—Ronald L. Wibert
*Assistant Examiner*—Michael J. Tokar
*Attorney, Agent, or Firm*—James C. Kesterson

[57] ABSTRACT

Optical apparatus comprising two similar prisms, preferably two 30°-60°-90° prisms, with their hypotenuses paralleled for use in providing conjugate compensation and optical axis shift is shown. Movement of either prism along a line which makes a particular angle with the optical axis will change the path length, and movement perpendicular thereto will shift the optical axis. In the case of two 30°-60°-90° prisms, the necessary angle is a 60° angle. By placing a roof on one of the prisms an odd number of reflections is introduced permitting the image to be rolled by rotating the two prisms. The roof also permits optical axis shift in a second direction when the prism is moved in a line perpendicular to the plane bisecting the roof.

16 Claims, 10 Drawing Figures

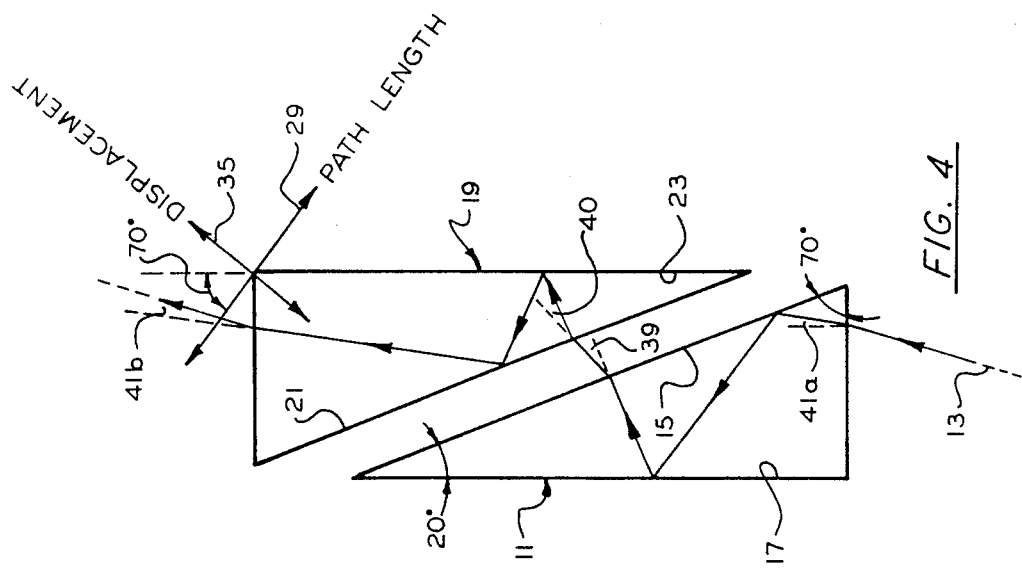
FIG. 4
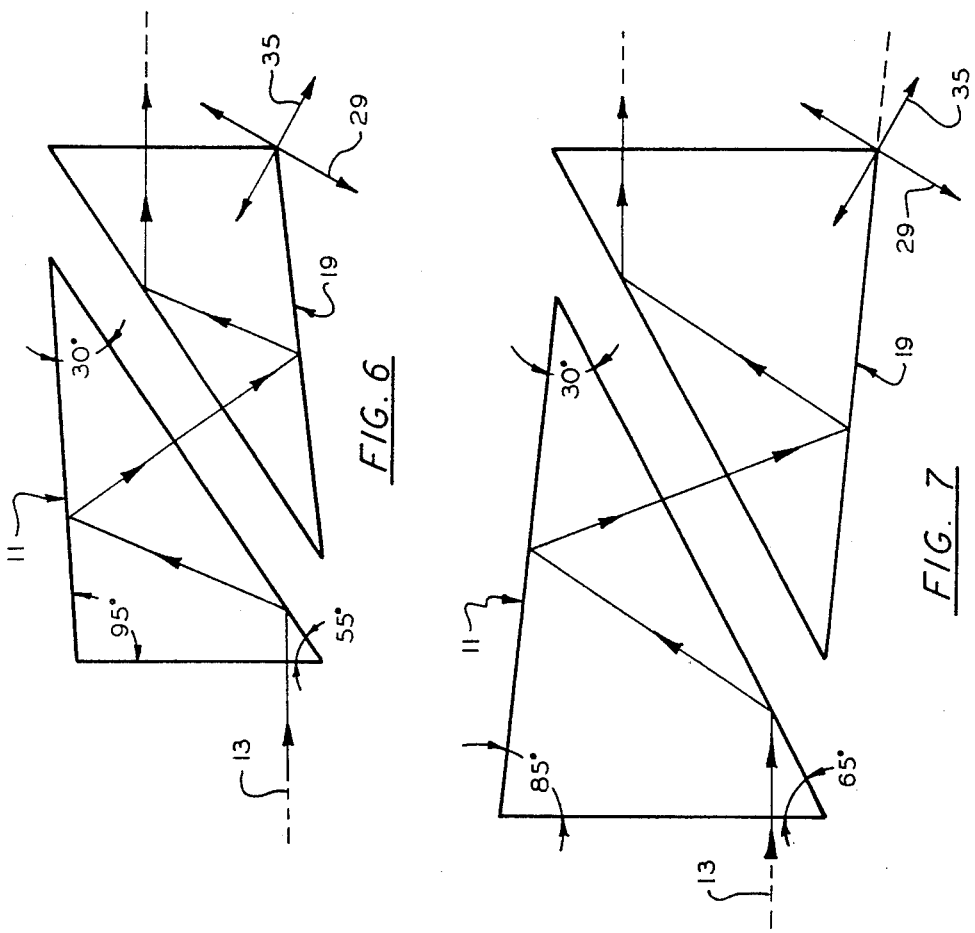
FIG. 6
FIG. 7

3,871,750

FOCUSING ROLL AND DISPLACEMENT PRISMS

CROSS-REFERENCES TO RELATED APPLICATIONS

This is a continuation-in-part of the application having Ser. No. 207,033 filed on Dec. 13, 1971, and now abandoned.

BACKGROUND OF THE INVENTION

This invention relates to optical apparatus in general and more particularly to an improved apparatus for changing path length, displacing an optical axis and rolling an image about an optical axis.

In probes such as those used in camera model systems for simulators it is desirable to have the capability to change the internal path length, shift the optical axis and roll the image. The reasons why such transformations are required and another system to perform them is described and discussed in application Ser. No. 207,035 filed by R. A. Mecklenborg and R. E. McClenahan on Dec. 13, 1971 and assigned to the same assignee as the present invention.

One problem in mounting optical elements within a probe is to keep probe size to a minimum since the probe must be supported and accurately driven in three degrees of freedom. The present invention helps to solve this problem by using two similar prisms which adjoin each other in such a way as to minimize space problems.

It is an object of this invention to provide an optical apparatus for changing internal path length.

Another object is to provide such apparatus which will also shift the optical axis.

A further object is to provide such apparatus which may be used to roll an image.

Still another object is to provide such apparatus which is compact.

It is also an object to provide such apparatus for use in camera model probes.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

SUMMARY OF THE INVENTION

Briefly, therefore this invention discloses unique optical apparatus particularly suitable for use in the optical probe of a camera model system of a flight simulator. According to one embodiment, the invention comprises a pair of prisms having a similar angular construction and fabricated from material having the same index of refraction. One of the prisms is arranged to receive an image transmitted along an optical axis of the apparatus at its entry-exit face which intersects the optical axis. The entry-exit face is the smallest of the three surfaces of the prism. The second prism is arranged such that its hypotenuse surface is adjacent or parallel to the hypotenuse surface of the first prism. The hypotenuse surfaces are those surfaces opposite the largest of the three prism angles, and in the case of a right angle prism would be the surfaces opposite the 90° angle. The two prisms are also arranged such that the light image is transmitted from the first prism to the second prism at the two hypotenuse surfaces and such that the image is projected or transmitted out of the optical apparatus along a second optical axis at the entry-exit surface of the second prism. The second optical axis being parallel to the first and in some instances is located such that the two optical axes are coincident. The angular construction of the pair of prisms is selected such that the angle of incidence of the light image at the hypotenuse surface is greater than the critical angle when reflection is required and is less than the critical angle when transmission is required. The invention also includes means to selectively position one of the two prisms along a line which is at an angle with respect to the second optical axis which angle is equivalent to the angle between the entry-exit surface and the hypotenuse surface. The movement of the prism results in the path length through the optical apparatus changing. The invention also includes other apparatus for selectively moving the two prisms for adjusting the displacement of the two optical axes.

BRIEF DESCRIPTION OF THE DRAWINGS

For a fuller understanding of the nature and objects of the invention, reference should be made to the following detailed description taken in connection with the accompanying drawing, in which:

FIGS. 2 through 4 are elevation views of other embodiments of the present invention using different angular configurations of right angle prisms;

FIGS. 6 and 7 are yet other embodiments of the present invention which do not use right angle prisms;

DESCRIPTION OF THE INVENTION

Figure 1:
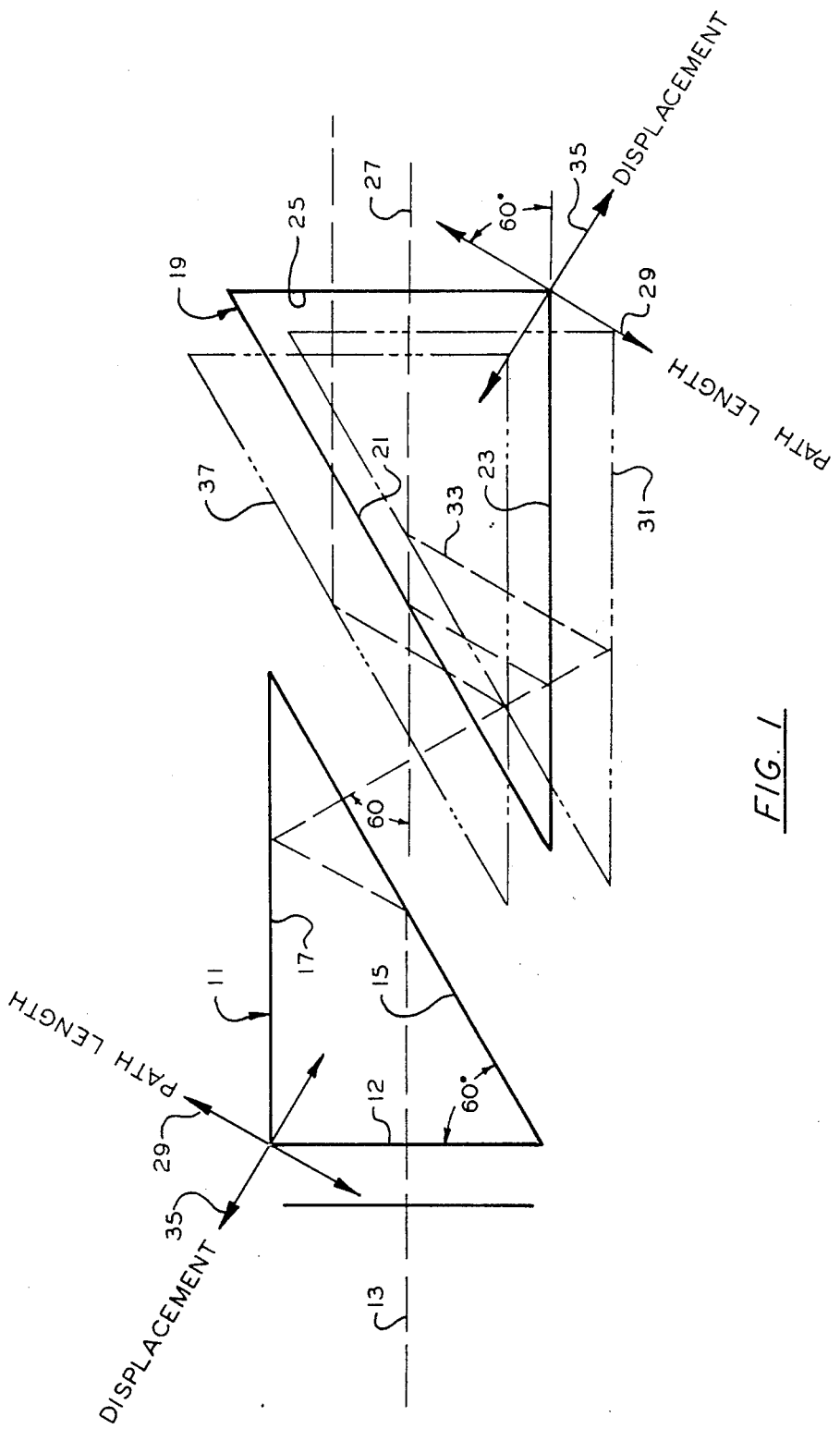
FIG. 1 is an elevation view of one embodiment of the present invention using two 30°-60°-90° prisms.

In FIG. 1 there is shown a preferred embodiment which includes a first 30°-60°-90° prism 11 arranged with its short side 12 perpendicular to an input optical axis 13. A ray on the axis will enter, strike side 15, and be reflected to side 17 where it will again be reflected to exit perpendicular to side 15. A second 30°-60°-90° prism 19 is placed with its hypotenuse 21 adjacent to and parallel to that of prism 11. The ray will pass through side 21, be reflected by side 23 back to side 21 where it will be reflected toward exit side 25 which is perpendicular to the ray. As the ray exits side 25, it forms exit axis 27. It should be noted at this point, and will be discussed in more detail later, that the material from which the prisms are made be such that to achieve reflection of the light beam at surfaces 17 and 23, these surfaces may require specular coatings of aluminum or silver. This would be necessary, of course, only if the angle of incidence at which the light beam strikes surfaces 17 and 23 is less than the critical angle. The critical angle will of course vary with the index of refraction of the prism material.

If movement of prism 19 is restricted so that the reflection from face 21 is always on the extension of axis 13, the exit axis 27 will also remain aligned. For example, the prism can be moved in the direction indicated by lines 29 and still maintain this condition. But, as the prism 19 (or prism 11 may be moved) is moved in this direction, the internal path length is changed. This type of movement is indicated by the prism shown in double dot-dashed lines 31 and its ray 33 shown in dotted lines.

Movement of the prism along line 35 which is in a direction perpendicular to that indicated by line 29 will result in the exit axis 27 being displaced from the input axis 13 wihout any change in path length. This is shown by the outline of the prism in triple dot-dashed lines 37 and the ray in dash lines. Movement of side 21 closer to side 15 compensates for the increased path length within the prism resulting in no overall change in path length from entrance to exit. Thus, path length and displacement in one direction may be independently controlled.

Figure 3:
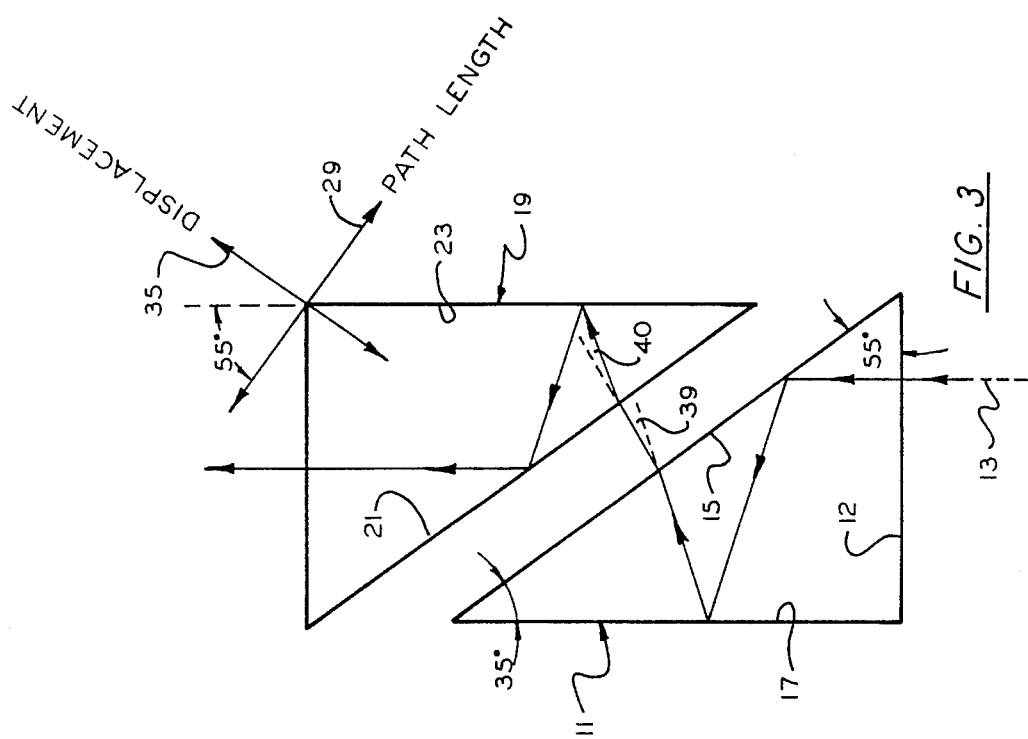
Figure 2:
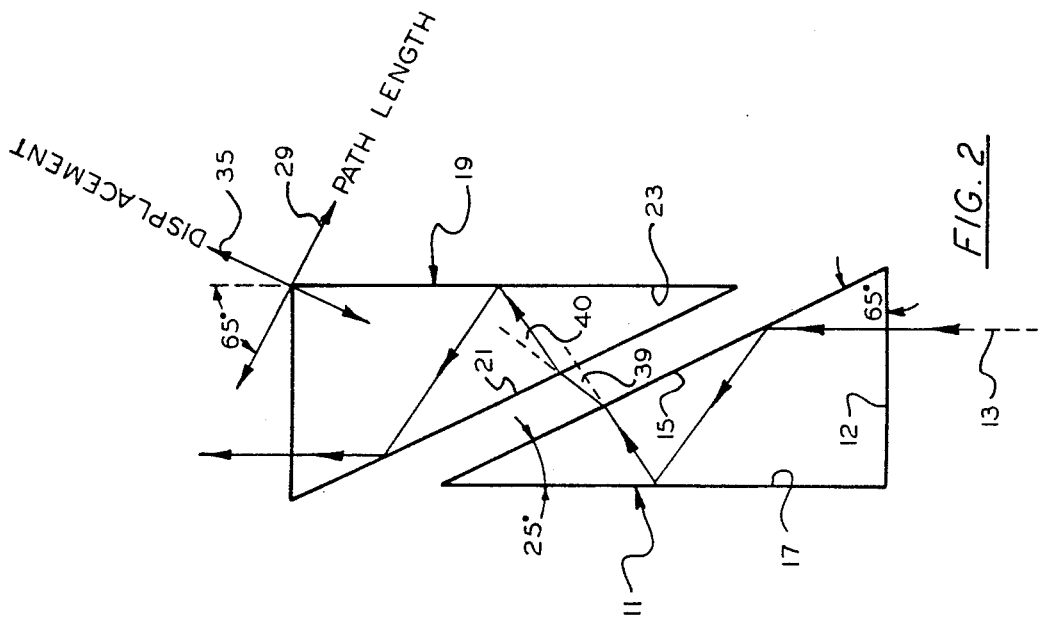

It will be appreciated that a pair of similar angle prisms other than 30°-60°-90° prisms may also be used so long as the pair of prisms being used have the same angular construction. For example, a pair of 25°-65°-90° prisms suitable for use with this invention is shown in FIG. 2 and a pair of 35°-55°-90° prisms also suitable for use with this invention is shown in FIG. 3. In addition, as is clearly shown in FIGS. 2 and 3, movement of prism 19 along the path indicated by lines 29 and 35, which lines are mutually perpendicular, will still result in changes in path length or image displacement. However, it should be noted that line 29 is no longer oriented at a 60° angle with respect to the input optical axis 13, but is oriented at a 65° angle for the pair of 25°-65°-90° prisms of FIG. 2 and at a 55° angle for the pair of 35°-55°-90° prisms of FIG. 3. That is, in the case of a pair of right angle prisms, movement for changing path length is along line 29 which is oriented with respect to the input optical axis 13 at an angle equivalent to the larger of the two acute angles of the prism; and movement for changing displacement is along line 35 which is oriented perpendicular to line 29. It should also pointed out that, except for a pair of 30°-60°-90° prisms, with every angular construction of a pair of right angle prisms, there will be some refraction of the light path when the light exits prism 11 and again when the light enters prism 19. This refraction is represented by the angles at 39 and 40, respectively. Since both prisms will typically be fabricated from the same material, the light refraction occurring at surface 15 of prism 11 is negated by the light refraction occurring at surface 21 of prism 19. However, it should be noted at this point that if a pair of 30°-60°-90° prisms are selected for use, and the optical axis is perpendicular to the entry face 12 and exit face 25, then it is not necessary for the two prisms to be fabricated from material the same index of refraction. Differences in the index of refraction in such a case is possible since a ray of light will always enter and exit any of the prism surfaces perpendicular to that surface.

As was mentioned heretofore, it will be appreciated, of course, that in any situation some consideration must be given to the prism angles and the index of refraction of the material from which the prisms are made.

For example, at every surface which must be both reflective and transmissive, it will be necessary that the critical angle not be greater than the angle of incidence (i.e., the angle the optical path makes a line perpendicular to the prism surfaces) at the surface when reflection is necessary, and that the critical angle not be less than the angle of incidence when transmission is required. Since the critical angle $\alpha$ varies as a function of the index of refraction, $n$, according to the equation $\sin \alpha = 1/n$, it will be appreciated that the critical angle can be predetermined by selecting a prism material having a material index of refraction. Thus, if as shown in FIGS. 1-3, the ray of light enters along an optical axis perpendicular to entry face 12 and assuming that sides 17 and 23 of prisms 11 and 19, respectively are silvered, and further assuming the prism is made of a material having a refraction index of 1.6, then similar right angle prisms having an angular construction of between approximately 42.9° -47.1° -90° and approximately 17°-73°-90° are suitable for use with this invention. However, as will be appreciated by those skilled in the art, no matter what the index of refraction, and even with silvering applied to surfaces 17 and 23, the prisms must be other then equal angular prisms. That is, in the case of a pair of right angle prisms, one of the acute angles must be less than 45°. As will also be appreciated, more effective results will be achieved if the prisms selected are constructed well within the two sets of angular limits as determined by the index of refraction. A suitable angular configuration for a pair of prisms made of a material having an index of refraction of 1.6 and not even requiring a specular coating on faces 17 and 23 would be 20°-70°-90°, as shown in FIG. 4. Also, as will be understood by those skilled in the art, and illustrated in FIG. 4, it is not necessary that the optical axis of the two prisms be perpendicular to the entry face, as any refraction (angle 41a) occurring at the entry face of a first prism would be negated by refraction (angle 41b) at the exit face of the second prism.

Figure 5:
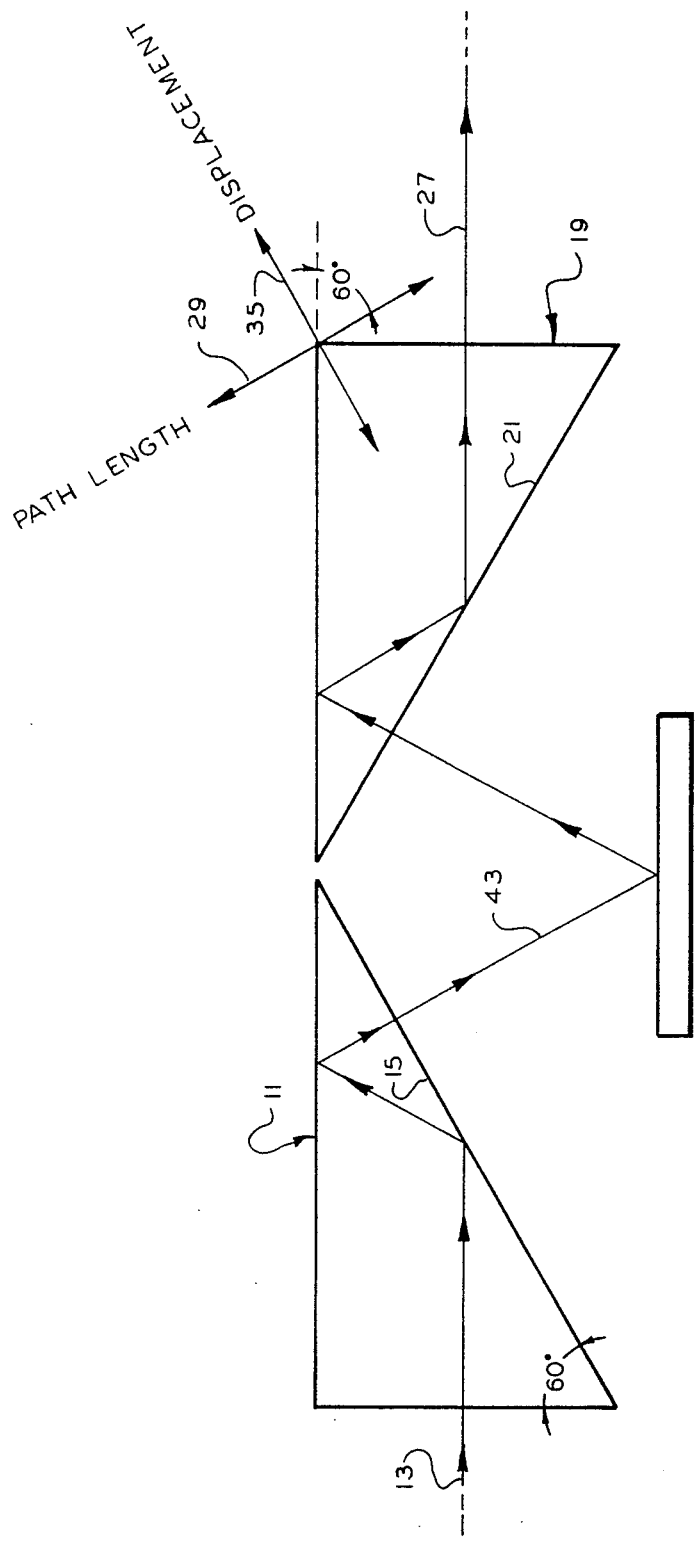
FIG. 5 shows still another embodiment of the present invention which also includes a mirror.

However, in the embodiments heretofore discussed, rotation of the prisms about the axis 13 or 27 will not result in rolling of the image as is required in some cases since the system has an even number of reflections. FIG. 5 shows an arrangement, also using 30°-60°-90° prisms, which results in an odd number of reflections permitting image roll to be accomplished by rotating the apparatus about axis 13 or 27. The prisms 11 and 19 are placed point to point and a mirror 42 placed below them. Now a ray 43 exiting side 15 will be reflected by mirror 42 before entering side 21. This added reflection makes the number of reflections odd, permitting image roll. Otherwise, operation is identical to FIGS. 1-4 with path length controlled by movement in direction 29 and displacement by movement in direction 35.

Still, as fully described in the Mecklenborg et al., application above, displacement in two directions may be required. It can be seen that, as the apparatus of FIG. 5 is rotated to roll the image, a displaced exit axis would follow a circular path. Generally this is not desirable. To keep the exit 27 in the same place as the apparatus is rolled, the displacement must be resolved into two components which can be controlled as the apparatus is rotated.

It will also be appreciated that prisms other than 30°-60°-90° can be used with this arrangement just as were used with the arrangement shown in FIGS. 1 through 4. However, with this arrangement, the optical axis must be perpendicular to the entry and exit faces of the prism as otherwise the odd number of reflections would result in a light ray exiting at an angle twice the entry angle.

Even though the embodiments discussed heretofore only include right angle prisms, it will be appreciated that prisms other than right angle prisms may also be used so long as the critical angle of a surface which must both reflect and transmit is less than the angle of incidence when reflection is required and is greater than the angle of incidence when transmission is required. FIGS. 6 and 7 show still other embodiments of the present invention where a pair of 30°–55°–95° and 30°–65°–85° prisms, respectively, are used.

Figure 8:
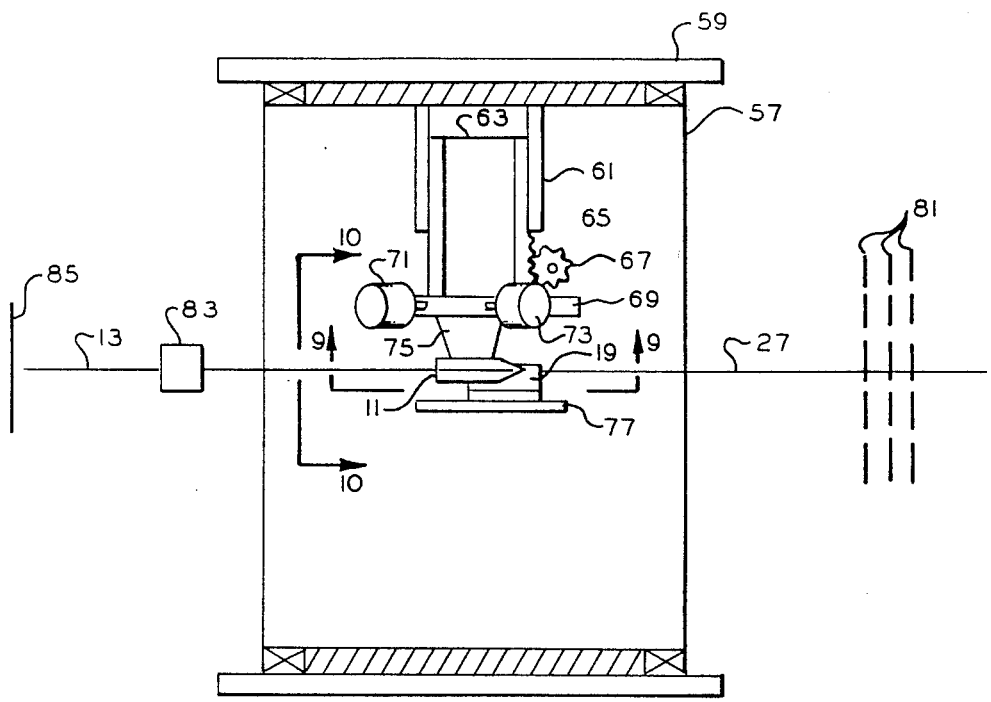
FIG. 8 is a cross-sectional view of the prisms mounted for movement inside a cylinder and also shows one prism modified with a roof on it.
Figure 9:
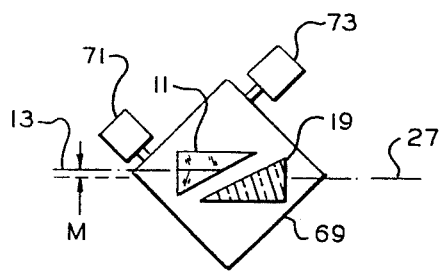
FIG. 9 is a first sectional view of the apparatus of FIG. 8 showing the orientation of the X-Y table.
Figure 10:
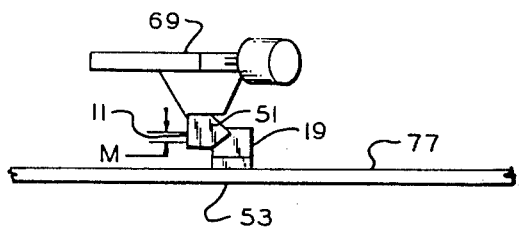
FIG. 10 is a second sectional view of the apparatus of FIG. 8 showing the roof prism.

FIGS. 8, 9 and 10 illustrate apparatus to accomplish all the desired types of motion described above and to add an additional degree of axis displacement. Prism 11 has had a roof placed on it as can be seen by examining FIG. 10. This has two beneficial effects. It introduces an odd number of reflections, permitting image roll to be accomplished by rolling the prisms 11 and 19 about axis 13 or 27, and it permits displacement of the optical axis in a direction perpendicular to that shown on FIGS. 1 through 5, i.e., in and out of the paper.

Referring for a moment to FIG. 1 and FIG. 10, a ray entering side 12 will be reflected by side 15 to (as can be seen on FIG. 10) one of sides 51 or 53 from which it will be reflected to the other sides 51 or 53 and thence as described in connection with FIG. 1 out of the prism through side 17. Movement of prism 11 in or out of the paper when viewed as on FIG. 1 (or up and down as viewed in FIG. 10) will shift the optical axis in a corresponding manner.

Prisms 11 and 19 are mounted inside a cylinder 57 which is supported in suitable bearing means inside a cylinder 59 for rotation therein. Conventional servo drive means may be used to rotate cylinder 57 within cylindner 59. Inside cylinder 57 and centered on a radial thereof is a cylinder 61 which has slidably mounted within it a cylinder 63 having mounted on a portion of its circumference a rack gear 65. Gear 65 is driven by a pinion gear 67 mounted on the shaft of a motor which may be part of a conventional servo system.

Affixed to the end of cylinder 63 is an X–Y table 69 constructed in conventional fashion with motors 71 and 73 providing drives for the table. These motors may be part of a servo system such as that shown in the Mecklenborg et al application cited above. Supported for movement with the X–Y table is mounting member 75 to which prism 11 is glued or attached in other conventional fashion.

Prism 19 is supported by a member 77 fixed so that prism 19 is intersected by a diameter of cylinder 57 perpendicular to the radial of cylinder 61. Prism 19 may be glued or otherwise affixed to mount 77. Mount 77 may be held in place by adjustment screws of the type well known in the optical art to permit alignment.

Table 69 is rotated 60° from the axis 27 as is shown on FIG. 5 so that motion will be along the directions indicated by arrows 29 and 35 of FIG. 1. Thus, if dotted lines 81 represent an intermediate image plane which can vary over the positions shown, 83 is a fixed relay lens, and 85 a final image plane which must remain fixed it can be seen that a servo system controlling motor 71 of X–Y table 69 may be used to position prism 11 to provide the required conjugate compensation by increasing or decreasing internal path length. Motor 73 will position the prism 11 in a direction perpendicular to that of motor 71 causing an axis offset in one direction as shown on FIG. 1. Offset perpendicular thereto is accomplished by movement of cylinder 63 by gear 67, which will move the apex of the roof off center. And image roll may be accomplished by rotating cylinder 57 within cylinder 59.

If the image is being rolled with the axis offset and the offset axis is required to remain fixed then a resolved combination of motions by motor 73 and cylinder 63 will be required. Assume an offset of M in the up direction caused by motor 73 with no roll as shown on FIGS. 9 and 10. It can be seen that if the assembly is rolled 90° the displaced axis will now be right or left and if rolled 180° down instead of up. Thus at 90°, in order to keep the axis fixed, motor 73 must remove all of its offset with the required offset supplied by movement of cylinder 63. At 180° motor 73 must drive prism 11 in the opposite direction. The proper position at all rotations will be defined by $X = N \sin \Theta + M \cos \Theta$
$Y = N \cos \Theta - M \sin \Theta$ where:
M is displacement up and down,
N is displacement right and left
X is the position controlled by motor 73
Y is the position of cylinder 63
Θ is the position of cylinder 57 with positive Θ counter-clockwise.

Such resolving techniques are well known. A servo for providing the required drives is disclosed in the above-cited Mecklenborg et al. application.

It will be recognized that the prisms may be mounted to give less than all the possible degrees of freedom, e.g., offset in one axis and displacement would require only the X–Y table, displacement and roll would require only one-half the X–Y table fixed to the rotating cylinder 57 without requiring cylinders 61 and 63, and so on.

One of the main advantages of the present system is in the small space which the prisms take up as compared to prior art devices. FIG. 8 does not really illustrate this compactness being intended solely to illustrate the various direction directions motion in a simple manner. It will be evident to those skilled in the art that the embodiment shown may be greatly compressed or that other more compact mountings may be used. These and other modifications may be made without departing from the spirit of the invention which is intended to be limited solely by the appended claims.

What is claimed is:

1. Optical apparatus for selectively controlling the transmission of a light image therethrough comprising:
a pair of similar prisms each having substantially the same angular construction, an entry-exit or first surface opposite the smallest or first of the three prism angles for transmitting light images therethrough, a hypotenuse or second surface opposite the largest or second of the three prism angles for selectively reflecting and transmitting light images impinging thereon, and a third surface opposite the third angle for reflecting light images impinging thereon,
a first prism of said pair arranged for receiving at its entry-exit surface a light image traveling along a first optical axis of said apparatus, said received image being internally reflected from said hypotenuse surface and said third surface, respectively, prior to being transmitted through said hypotenuse surface, said first prism being further arranged such that the angle of incidence of said light image at said hypotenuse surface is greater than the critical angle when reflection of the image is required and less than the critical angle when transmission is required, a second prism of said pair being arranged so that its hypotenuse surface is parallel and adjacent to the hypotenuse surface of said first prism for receiving said light image from said first prism and then, subsequent to internally reflecting said light image from said third surface and said hypotenuse surface, respectively, transmitting said light image through said entry-exit face of said second prism along a second optical axis parallel to said first optical axis; and means for selectively positioning one of said first an second prisms along a first line which makes an angle with said second optical axis, which angle is equivalent to the third prism angle, to change the path length of said light image through said optical apparatus.

2. The invention according to claim 1 and further including means to selectively position one of said prisms along a second line perpendicular to said first line whereby the offset of said second axis from a projection of said first axis may be controlled.

3. The invention according to claim 1 wherein the third surfaces of said first and second prisms have a specular coating applied thereto.

4. The invention according to claim 1 wherein said entry-exit faces of said first and second prisms are perpendicular to said first and second optical axis and wherein a roof comprises the third surface of one of said prisms.

5. The invention according to claim 4 and further including means to position said one prism with a roof along a third line, said third line being perpendicular to a plane bisecting the angle of the peak of said roof whereby offset of said second from said first axis in a first direction may be controlled.

6. The invention according to claim 4 and further including means to roll said prisms around one of said first and second axes.

7. The invention according to claim 4 and further including means to selectively position one of said prisms along a second line perpendicular to said first line whereby the offset of said second axis from the projection of said first axis in a second direction may be controlled.

8. Optical apparatus for selectively controlling the transmission of a light image therethrough comprising:

a mirror having its reflecting surface parallel to a first optical axis of said apparatus;

a pair of similar prisms each having substantialy the same angular construction, an entry-exit or first surface opposite the smallest or first of the three prism angles for transmitting light images therethrough, a hypotenuse or second surface opposite the largest or second of the prism angles for selectively reflecting and transmitting light images impinging thereon, and a third surface opposite the third angle for reflecting light images impinging thereon, a first prism of said pair arranged for receiving at its entry-exit surface a light image traveling along said first optical axis, said received image then being internally reflected from said hypotenuse surface and said third surface, respectively, prior to being transmitted through said hypotenuse surface onto said mirror, said first prism being further arranged such that the angle of incidence of said light image at said hypotenuse surface is greater than the critical angle when reflection of the image is required and less than the critical angle when transmission is required, a second prism of said pair being arranged with its entry-exit face parallel to said entry-exit face of said first prism and further arranged such that its hypotenuse surfacee intersects said light image reflected from said mirror and then, subsequent to internally reflecting said light image from said third surface and said hypotenuse surface, respectively, said light image is transmitted through said entry-exit face of said second prism along a second optical axis parallel to said first optical axis; and means for selectively positioning one of said first and second prisms along a first line which makes an angle with said second optical axis which angle is equivalent to the third prism angle thereby changing the path length of said light image through said optical apparatus.

9. The invention according to claim 8 and further including means to rotate said first and second prisms and said mirror about one of said optical axes while maintaining their relative positions.

10. The invention according to claim 8 and further including means to selectively position one of said prisms along a second line perpendicular to said first line whereby the offset of said second axis from a projection of said first axis may be controlled.

11. The invention according to claim 1 wherein said pair of similar prisms is a pair of similar right angle prisms.

12. The invention according to claim 1 wherein said pair of similar prisms is a pair of 30°-60°-90° prisms.

13. Optical apparatus for selectively controlling the transmission of a light image therethrough comprising:

a pair of similar prisms each having substantially the same angular construction, an entry-exit or first surface opposite the smallest or first of the three prism angles for transmitting light images therethrough, a hypotenuse or second surface opposite the largest or second of the three prism angles for selectively reflecting and transmitting light images impinging thereon, and a third surface opposite the third angle for reflecting light images impinging thereon, a first prism of said pair arranged for receiving at its entry-exit surface a light image traveling along a first optical axis of said apparatus, said received image being internally reflected from said hypotenuse surface and said third surface, respectively, prior to being transmitted through said hypotenuse surface, said first prism being further arranged such that the angle of incidence of said light image at said hypotenuse surface is greater than the critical angle when reflection of the image is required and less than the critical angle when transmission is required, a second prism of said pair being arranged so that its hypotenuse surface is parallel and adjacent to the hypotenuse surface of said first prism for receiving said light image from said first prism and then, subsequent to internally reflecting said light image from said third surface and said hypotenuse surface, respectively, transmitting said light image through said entry-exit face of said second prism along a second optical axis parallel to said first optical axis; and means for selectively positioning one of said first and second prisms along a first line which makes an angle with said second optical axis, which angle is equivalent to the third prism angle plue 90°, to change the offset of said second axis with respect to a projection of said first axis.

14. The invention according to claim 8 wherein said pair of similar prisms is a pair of similar right angle prisms.

15. The invention according to claim 8 wherein said pair of similar prisms is a pair of 30°–60°–90° prisms.

16. Optical apparatus for selectively controlling the transmission of a light image therethrough comprising:

a mirror having its reflecting surface parallel to a first optical axis of said apparatus;

a pair of similar prisms each having substantially the same angular construction, an entry-exit or first surface opposite the smallest or first of the three prism angles for transmitting light images therethrough, a hypotenuse or second surface opposite the largest or second of the prism angles for selectively reflecting and transmitting light images impinging thereon, and a third surface opposite the third angle for reflecting light images impinging thereon, a first prism of said pair arranged for receiving at its entry-exit surface a light image traveling along said first optical axis, said received image then being internally reflected from said hypotenuse surface and said third surface, respectively, prior to being transmitted through said hypotenuse surface onto said mirror, said first prism being further arranged such that the angle of incidence of said light image at said hypotenuse surface is greater than the critical angle when reflection of the image is required and less than the critical angle when transmission is required, a second prism of said pair being arranged with its entry-exit face parallel to said entry-exit face of said first prism and further arranged such that its hypotenuse surface intersects said light image reflected from said mirror and then, subsequent to internally reflecting said light image from said third surface and said hypotenuse surface, respectively, said light image is transmitted through said entry-exit face of said second prism along a second optical axis parallel to said first optical axis; and means for selectively positioning one of said first and second prisms along a first line which makes an angle with said second optical axis which angle is equivalent to the third prism angle plus 90°, to change the offset of said second axis with respect to a projection of said first axis.

* * * * *

UNITED STATES PATENT OFFICE
CERTIFICATE OF CORRECTION

PATENT NO. : 3,871,750
DATED : March 18, 1975
INVENTOR(S) : Richard A. Mecklenborg It is certified that error appears in the above-identified patent and that said Letters Patent are hereby corrected as shown below:

Col. 4, line 7, change "material" to --particular--.

Col. 6, line 40, delete "direction" and insert --of-- after "directions".

Col. 8, line 11, change "surfacee" to --surface--.

Signed and sealed this 15th day of July 1975.

(SEAL)
Attest:

RUTH C. MASON
Attesting Officer

C. MARSHALL DANN
Commissioner of Patents
and Trademarks